United States Patent [19]

Ernst

[11] Patent Number: 5,320,655

[45] Date of Patent: Jun. 14, 1994

[54] INCINERATABLE HOLDING FRAME FOR FILTER BAGS, AND METHOD OF MAKING THE FRAME

[75] Inventor: Theodor Ernst, Wettingen, Switzerland

[73] Assignee: Zenteco AG, Wettingen, Switzerland

[21] Appl. No.: 124,158

[22] Filed: Sep. 20, 1993

[30] Foreign Application Priority Data

May 7, 1993 [CH] Switzerland ............... 01409/93

[51] Int. Cl.$^5$ .................................... B01D 46/02
[52] U.S. Cl. ......................... 55/378; 55/381; 55/497; 55/501; 55/527; 55/528; 55/DIG. 31; 229/168
[58] Field of Search ........... 55/378, 380, 381, 497, 55/501, 527, 528, DIG. 31; 229/168, 169

[56] References Cited

U.S. PATENT DOCUMENTS

| | | | |
|---|---|---|---|
| 2,531,255 | 11/1950 | Clarke | 229/168 X |
| 3,154,393 | 4/1958 | Klein et al. | |
| 3,830,045 | 8/1974 | Copenhefer | |
| 3,938,973 | 2/1976 | Kershaw | 55/501 |
| 4,105,423 | 8/1978 | Latakas et al. | |
| 4,561,587 | 12/1985 | Wysocki | 229/169 |
| 4,636,233 | 1/1987 | Lizmore | 55/501 |

FOREIGN PATENT DOCUMENTS 2449330 4/1976 Fed. Rep. of Germany .

Primary Examiner—Charles Hart
Attorney, Agent, or Firm—Frishauf, Holtz, Goodman & Woodward

[57] ABSTRACT

To permit environmentally safe incineration of a filter bag together with its holding frame, and without requiring removal of the holding frame prior to incineration, the holding frame is made of fibers or cellular pulp stock, and, in plan view, is essentially rectangular. It is formed of two folded walls which, before insertion of the folding bag, are in essentially V shape, with an outer wall (6) and an inner wall (7), the V defining a gap of between 25° to 50°, preferably about 38°, between which gap the filter bag is inserted. The inner wall, at the corner, is formed with a wedge-shaped gusset (9), with folding creases (10, 11) and a crest crease (12) between the folding creases. After insertion of the filter bag, the inner wall (7) is pressed against the outer wall (6), and the gussets snapped against the inner wall, to hold the frame together. The inner surfaces of the inner and outer walls (7, 6) can be coated with an adhesive (28), for example a heat-responsive adhesive, for reliable adhesion of the filter bag, and the inner tip of the V can be reinforced by a reinforcing strand, rope, filament, tape or wire (26). The frame is made by forming the frame walls with extending flanges (17, 18), the inner wall, for example, being connected by a web (17). After the pulp has dried, and the frame is stable, the flanges and/or the web are trimmed off, and the waste or trim material can be recycled for further pulp stock, to make additional frames.

20 Claims, 4 Drawing Sheets

INCINERATABLE HOLDING FRAME FOR FILTER BAGS, AND METHOD OF MAKING THE FRAME

FIELD OF THE INVENTION

The present invention relates to filter bags, and more particularly to holding frames into which filter bags to filter contaminated gases can be inserted, and which are entirely incineratable, so that disposal of the filter bags, after use, does not require separating non-environmentally benign, incineratable materials from other materials, and to a method of making such filter bags.

BACKGROUND

Commercial air filters are known in which filter bags are held in frames, which are made of metal or plastic. Such filter bags can be combined in groups to entire filter bag systems or units. The filter bags themselves are supported by filter bag frames made of metal or plastic and, further, assist in reinforcing and maintaining the shape of the filter bags.

In use, air to be filtered is passed through the filter bags. After some time, the filter bags will be loaded with dirt or dust particles and must then be separated from the support frames which, customarily, are made of metal or of plastic. The filter bags can be disposed of in incinerators. Removal services accept frequently only completely incineratable or combustible substances, that is, filter bags which have no other components or materials than the bags and their contents themselves or, possibly, minor metallic parts which are neutral in an incinerator, such as staples or the like.

THE INVENTION

It is an object to provide a filter bag support frame, and filter bag—frame combination, as well as a method of making the frames, in which the individual filter bags are suitably supported, while the frame is made of inexpensive, light-weight, readily combustible or incineratable material, so that the previously necessary step of releasing and separating the filter bags from the support frame can be eliminated and the filter bag, together with the support frame, can be incinerated.

Briefly, the incineratable holding frame is formed of a fibrous or cellular pulp stock material which, in plan view, is essentially rectangular, to form a unitary circumferentially continuous frame element or collar. The filter bag frame is a folded, unitary structure which, in cross section, is essentially V-shaped, so that the frame defines an outer wall and an inner wall, coupled together at a ridge line. The walls are adapted to clamp the filter bag therebetween. The inner and outer wall, before positioning a filter bag therebetween, form an essentially V-shaped gap. A wedge-shaped gusset is formed at the corners of the inner wall, the gusset having folding creases connecting the gusset with the adjacent longitudinal portions of the rectangle of the inner wall. The gusset has a ridge or gusset crease between the connecting creases. The gusset, thus, defines two essentially wedge-shaped gusset portions which, when a filter bag has been placed against the inner surface of the outer wall, can be folded against the outer wall, with the filter bag therebetween, to thereby clamp the edge regions of the filter bag between the inner and outer wall of the frame element.

In accordance with a feature of the invention, the frame is made as a single unitary element of fibrous pulp, which can be shaped or molded when still wet, in such a way that the outer and inner legs of the walls of the frame already are shaped to define the V shape of the walls of the frame.

To facilitate manufacture, a raw frame is formed in which the walls are in essentially trough-like shape, with lateral flanges and a central connecting web; the flanges and the web are separated or severed after the previously wet pulp has dried sufficiently to stabilize the frame. The severed pulp material can be recycled for re-use in making further frames.

The frame has the advantage that it can be made in mass production, forming only a single unitary element which is constituted of a cheap and readily available wood pulp or cellulose stock. Pulp fibers or pulp board can be used, and recycled paper, likewise, can be used therefor. The frame, including a filter bag of conventional construction, after the filter bag has accepted dust or contaminants, can be incinerated together with the filter bag. There is no material in the frame which might emit toxic vapors—as might be the case with plastic frames. Forming the support frame as a single unitary continuous element in which the corners can be snapped in clamping position by pressing the gussets of the inner wall against the corners of the inner or the outer wall, with the filter bag therebetween, additionally ensures a reliable seal in the region of the corners of the frame and, hence, of the filter bag.

Forming the frame, when still wet and soft, with severable stiffening webs or flanges ensures that the finished frame will have the desired shape and dimensions.

DRAWINGS

DETAILED DESCRIPTION

Figure 1:
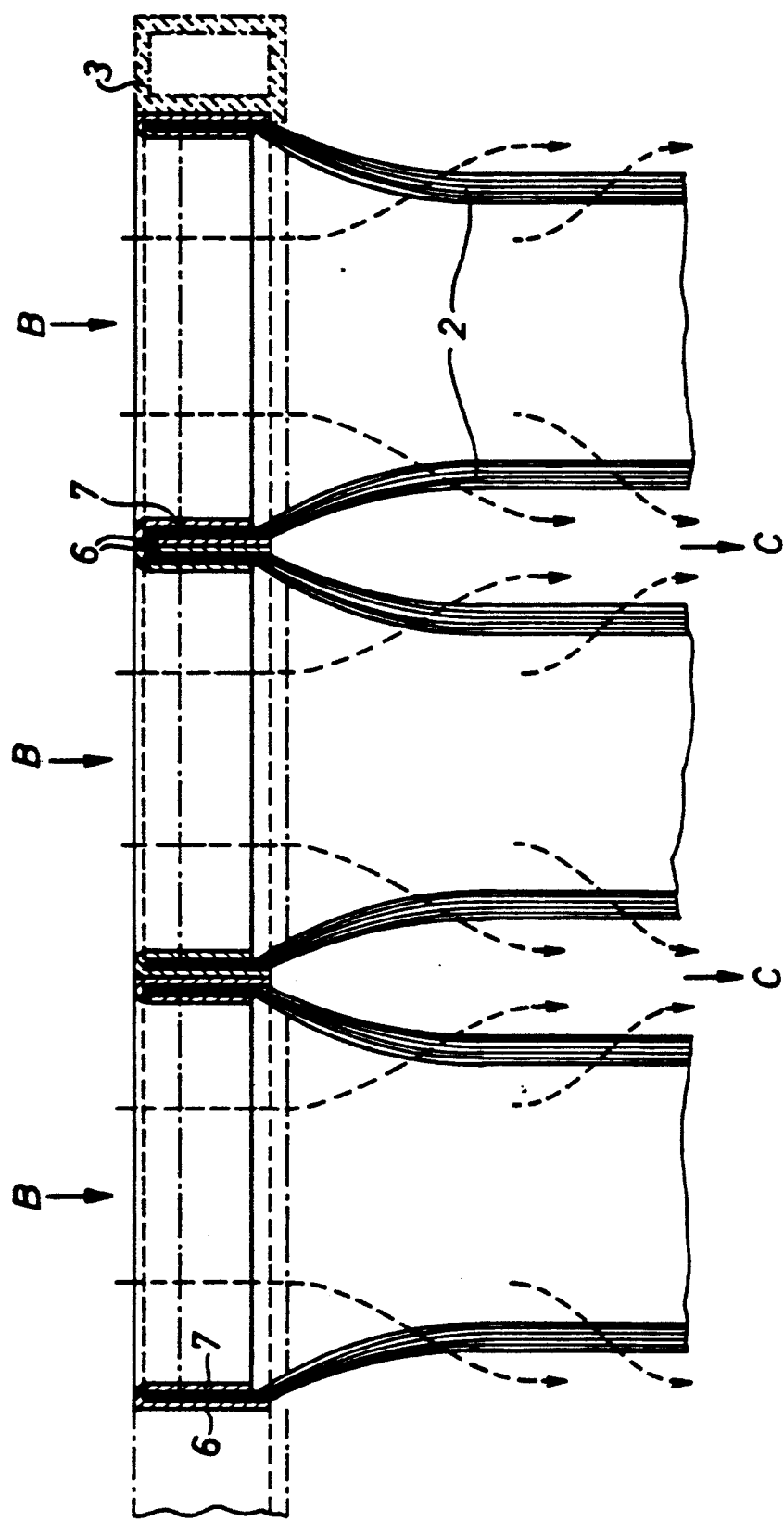
FIG. 1 is a front view of an air filter system having the frames and a plurality of filter bags held in a system frame.

The filter element of the system shown in FIG. 1 is a bag-like structure, closed at the bottom, to form a filter bag. At the open side it is held in position in a rectangular support frame 1. A plurality of such filter bags 2, with support frames therein, are combined to form a filter system or filter array, or a filter battery which, at the outside, is supported and surrounded by a system frame 3. Gas, which may carry contaminants, dust, other particles and the like, are is conducted from the front side of the frame in the direction of the arrows B into the filter bags. The gas, typically air, passes through the walls of the filter bags and leaves the contaminants in the filters. The cleaned air is withdrawn or passes out in the direction of the arrows C in FIG. 1. Residue previously in the contaminated air remains in the interior of the filter bags.

Figure 4:
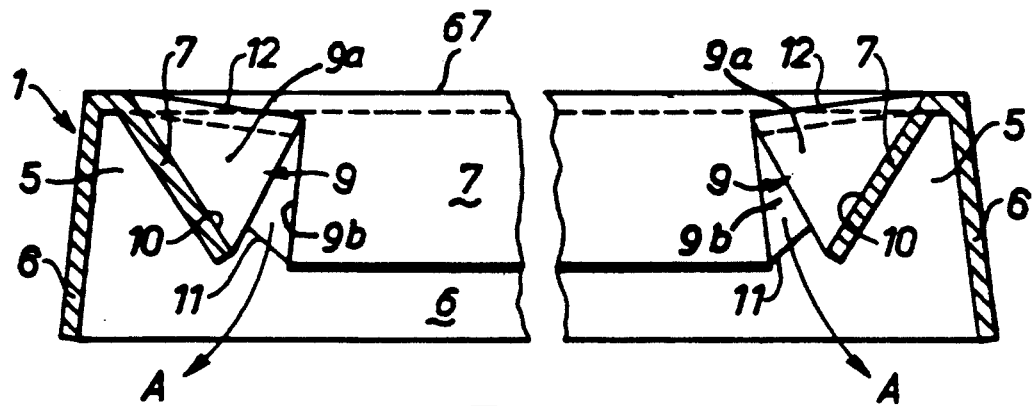
FIG. 4 is a cross-sectional view through the corner regions of the frame, with the gusset.

In accordance with the present invention, the frame 1 is made of fibrous pulp material, preferably in form of a dried, that is dehydrated, felt-like cellular pulp stock. The starting material is an aqueous slurry, for example, of wood pulp, recycled paper, or the like, including any contaminants in recycled paper or the like. The frame 1 is a unitary, essentially rectangular structure, which has gussets 9 at the corners. Before inserting the filter bag 2 into the frame, the outer wall 6 of the frame 1, which is slightly outwardly inclined, defines, together with the inner wall 7 of the frame, an acute angle $\alpha$ (FIG. 5) of between about 25° to 50°, preferably about 38°. That angle is preferably the same at all four sides of the rectangle. At the corners, a wedge-shaped gusset 9 is formed which, in cross section, is essentially triangular, and which extends into the interior region or space of the frame—see FIG. 4. Before inserting the filter bag 2, the opening of the gusset 9, as illustrated in FIG. 4, extends inwardly, in FIG. 4 downwardly. The gussets, together with the inner walls 7 of the frame 1, are one continuous web of fibrous pulp material.

Figure 2:
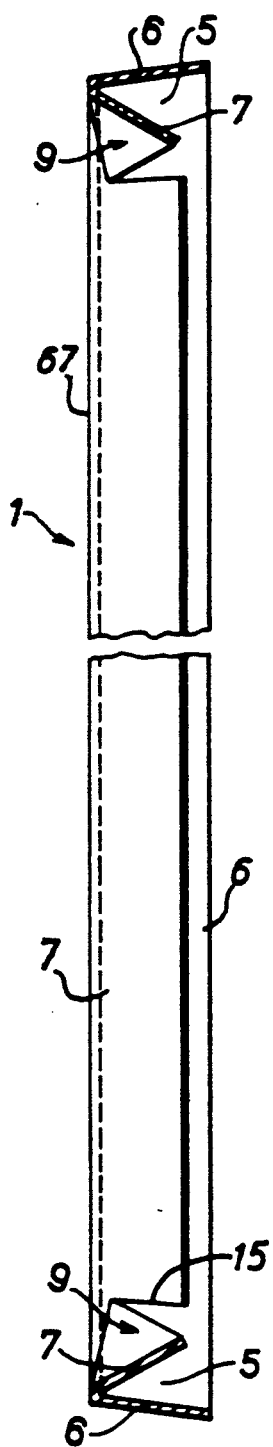
FIG. 2 is a longitudinal cross section through a filter bag frame before a filter bag is inserted therein, taken along lines II—II of FIG. 3.
Figure 3:
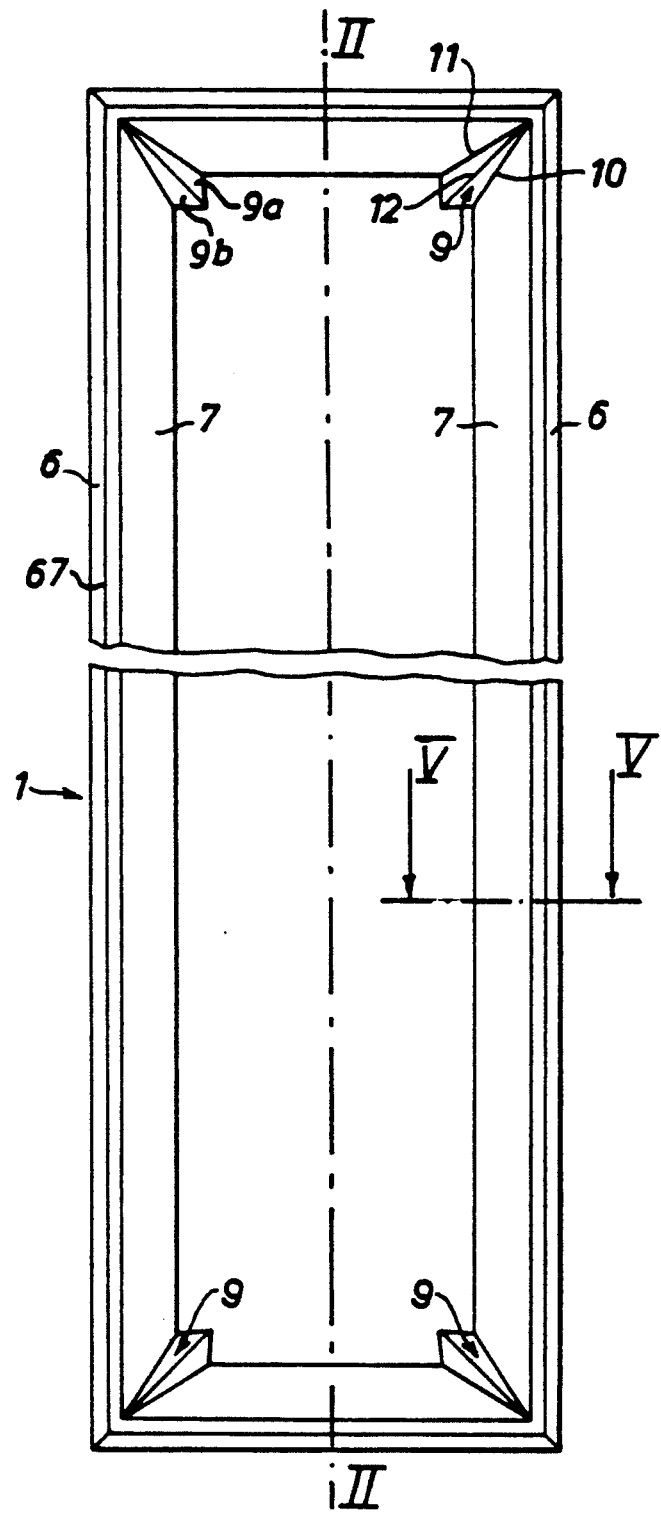
FIG. 3 is a front view of the frame.
Figure 7:
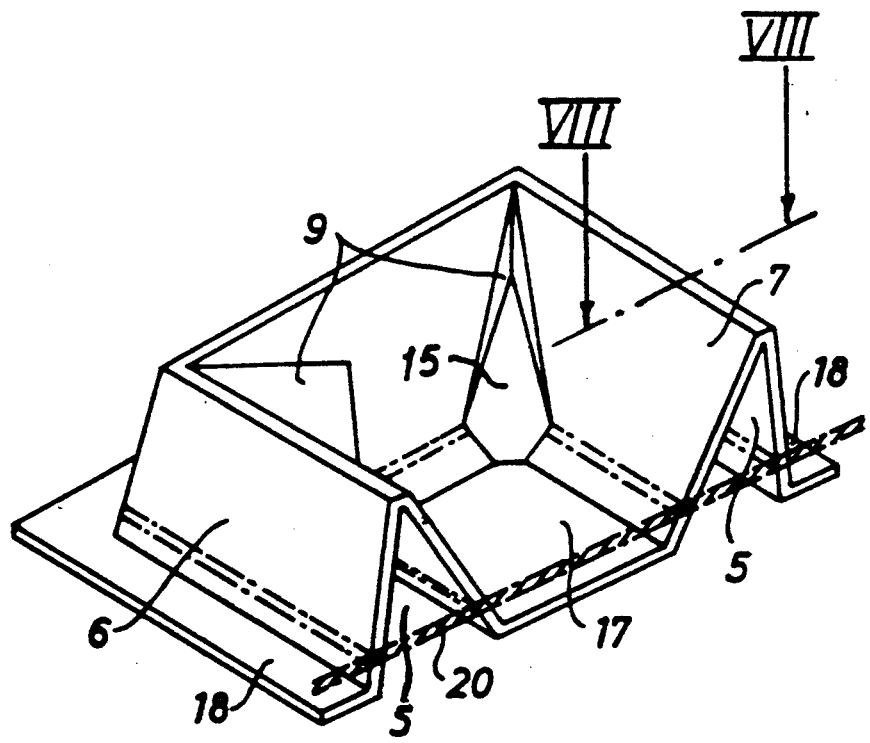
FIG. 7 is a fragmentary perspective view of a raw filter bag structure, with stiffening flanges or webs, and before severing of the stiffening flanges or webs.

Each one of the gussets 9 has three folding creases 10, 11, 12. The two folding creases 10, 11 connect gusset portions 9a, 9b of gusset 9 to the adjacent wall 7; the third crease 12 is a peak or ridge crease, which connects the gusset portions 9a, 9b (FIG. 4). Each one of the folding creases 10, 11, 12 which, preferably, may be scored or of lesser material thickness, is of approximately triangular shape. The inner end portions, remote from the tip of the gusset, can be recessed or cut off, as seen in FIGS. 2 and 7 at 15.

Insertion of a filter bag

Figures 5, 6:
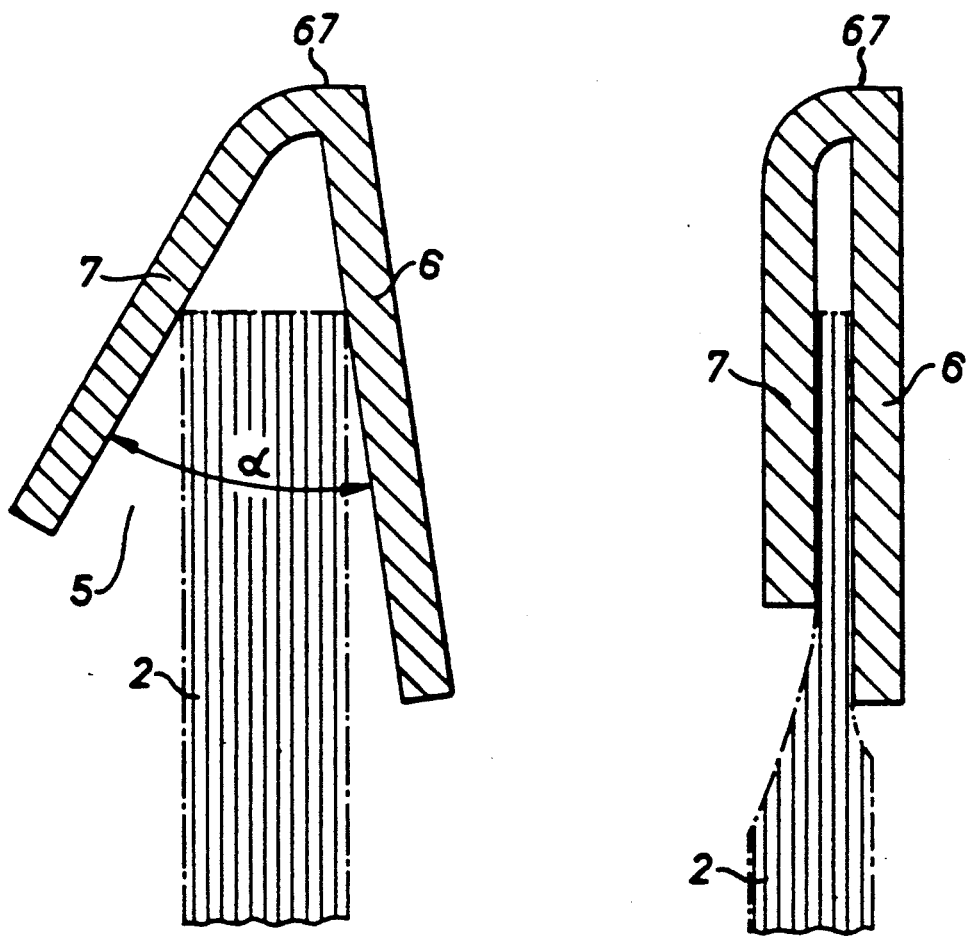
FIG. 5 is a cross section through one side of the filter frame, with a filter bag inserted therein, and before the corner gusset is snapped in position.
FIG. 6 is a cross section similar to FIG. 5, after the inner and outer wall have been snapped together.
Figure 8:
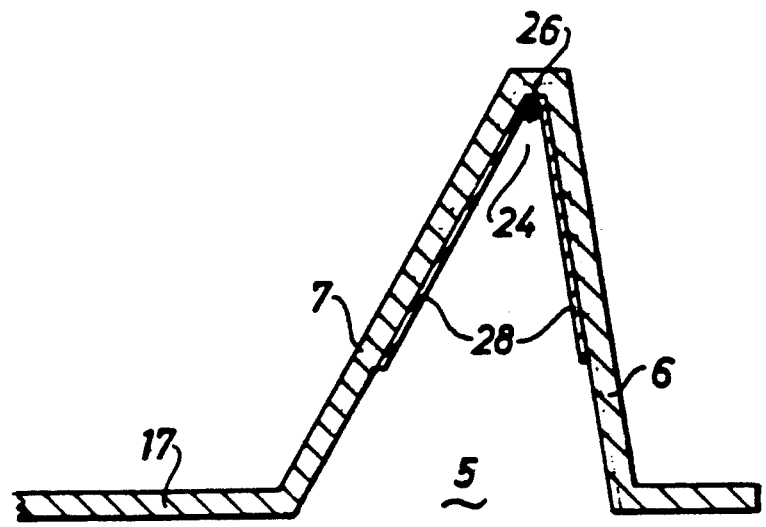
FIG. 8 is a cross section taken on a plane VIII—VIII of FIG. 7.

A filter bag is fitted into the V-shaped gap 5 of the frame, as seen in FIG. 5. The filter bags can be supplied with suitable openings for connection to the air to be filtered, see arrow B of FIG. 1. After placing the filter bags into the frame 1, that is, within the open gap 5 of the frame, the gussets 9 are pressed inwardly on all four corners in the direction of the arrow A, FIG. 4. Upon compressing the gusset inwardly, the V-shaped gap 5 will close, angle $\alpha$ becomes, effectively, 0°, and the filter bag 2 is clamped between the outer wall 6 and the inner wall 7, see FIG. 6. Until the dead-center position of the gusset is reached, a slight elastic deformation and elastic counter-pressure will occur at the gusset 9 and, in part, on the frame 1 itself. Once the gusset 9 is compressed inwardly, beyond a toggle or over-center position, the outer wall 6 will be approximately parallel to the inner wall 7. The gusset portions 9a, 9b also will have positions adjacent the inner wall 7, that is, each one of the gussets 9 forms the continuation of the inner wall 7 at an approximately right angle with respect to one of the legs of the rectangular inner wall.

The corner region, thus, forms an uninterrupted continuation of the inner wall 7 through or via the inwardly snapped gussets 9. This ensures continuous excellent sealing, so that no unfilterd gas or air can penetrate around the filter or the frame. Preferably, an adhesive is used to adhere the filter pocket 2 to the frame 1; the frames 1 can be adhered to the system frame 3 of the system, or otherwise connected thereto, for example by a clamping rail or the like.

Method of making the frame 1

A slurry of recycled paper, wood pulp, cellulose stock, pulp fibers, recycled pulp board, cardboard or the like, or any mixtures of the foregoing, is prepared which is formed, in well-known manner, in the shape of the frame 1, including the gussets. Since, immediately after formation, the raw frame is still soft and somewhat unstable, it is initially prepared in form of a trough which includes stiffening flanges and a stiffening web. Referring to FIG. 7, the inner legs 7 are stiffened by a web 17, which continuously inwardly connects the inner wall sections of the rectangular form. The outer wall 6 is formed with lateral flanges or extending elements 18 to further provide stiffness to the raw frame. Preferably, the flanges 18 are at least generally in the same plane as the web 17. The raw frame is then dried; this hardens the fibrous material. Before the filter bags 2 are inserted, the wall 17 and the flanges or edges 18 are severed, for example by cutting, shearing, or milling off, or the like. The severing cut or shear cut, if used, extends along a severing line 20, see FIG. 7. The waste which is thus generated can be recycled, that is, returned to the slurry for manufacture of further frames.

For some uses, the frame 1 should be stabilized, and, if desired, a stabilization element 26 can be inserted in the inner corner between the walls 6 and 7. This, preferably bead-like stabilization element may be a cord, or rope or tape element such as a paper rope, a plastic bead or line made of incineratable plastic material, such as low-density polyethylene, or a wire which, if metallic, remains as residue after incineration. Such an elongated stiffening element improves the tensile strength and stability of the frame 1, especially if the gas to be filtered is humid or moisture-saturated, that is, if the frame 1 becomes damp when in use.

The inner side of the wedge-shaped gap 5 can be coated with an adhesive 28 for adhesion of the filter bag. Preferably, a heat-activatable adhesise is used. The filter bags 2 are inserted, as above described, and when the inner and outer walls 7, 6 are snapped against each other, the adhesive 28 is then activated by heating.

Bag-type gas filters, for example air filters, can be readily disposed of, after they are filled or partially filled with dust particles, without the separating the filter bag 2 from the frame 1. Thus, bag and filter, as a unit, can be disposed of by incineration without requiring any disassembly. In some installations, the outer, usually rectangular, front frame 3 can be made of the same or similar combustible material, for example of cardboard or recycled carton or corrugated stock. Such filter systems or units can then be incinerated as a whole without requiring any disassembly.

Various changes and modifications may be made within the scope of the inventive concept.

I claim:

1. Incineratable holding frame for a filter bag (2), comprising a unitary frame element (1) of fibrous or cellulor pulp stock material which, in plan view, is essentially rectangular, and defines an outer wall (6) and an inner wall (7), said walls being coupled at a ridge line (67) to form a folded frame structure, said outer wall (6) and inner wall (7), before positioning of a filter bag therebetween, forming a gap (5) which, in cross section, is essentially V-shaped, the apex of the V defining said ridge line (67), the walls, after placement of a filter bag in said gap (5), being adapted to clamp the filter bag (2) therebetween;

a wedge-shaped gusset (9) formed at the corners of one (7) of the walls (6, 7) of the rectangular frame; folding creases (10, 11) formed at the connection of said gusset with the adjacent wall, said gusset (9) defining first and second gusset portions (9a, 9b) of essentially wedge shape, said gusset portions being connected together at a gusset crest crease (12);

and wherein, after placement of a filter bag in said gap (5), the gusset is folded against an adjacent wall (7) and provides for placement of the edge regions of the filter bag between the inner (7) and outer (6) walls of the frame element.

2. The frame of claim 1, wherein the V-shaped gap (5) has an opening angle ($\alpha$) of between about 25° and 50°, optionally about 38°.

3. The frame of claim 1, further including an elongated cord, rope or bead-like stiffening element (26) located at the inner corner of the V gap (5), said stiffening element, optionally, being a rope, a paper cord, a filament, or a wire.

4. The frame of claim 3, wherein the stiffening element (26) is adhesively retained in position in said gap (5).

5. The frame of claim 1, further including an adhesive layer (28), optionally a heat-activatable adhesive, located at the inner surfaces facing each other at said V gap (5) of the inner and outer wall.

6. The frame of claim 1, wherein the gusset (9) is folded against the inner wall (7).

7. A raw, semi-manufactured frame as claimed in claim 1,
wherein the frame includes stiffening webs or flanges (17, 18) coupled to free edge regions of said inner and outer walls, respectively.

8. The semi-manufactured frame of claim 7, wherein the stiffening elements (17, 18) comprise a web (17) connecting inner wall sections (7) of the frame element, and laterally projecting flanges or web portions extending outwardly from the outer wall (6) of the frame element,
and wherein the web (17) and the laterally projecting web portions or flanges (18) are positioned at least approximately in a common plane.

9. The frame of claim 1,
in combination with a filter bag (2),
wherein the V-shaped gap (5) is closed against edge regions of the filter bag (2), and the gusset portions (9a, 9b) are folded against one (7) of the walls of the frame (1) and against an edge portion of the filter bag (2), respectively.

10. The combination of claim 9, wherein the edge portions of the filter bag (2) and the inner surfaces of the inner wall (7) and the outer wall (6), respectively, of the frame are adhesively connected together.

11. The combination of claim 9, further including an elongated rope or bead-like stiffening element (26) located at the inner corner of the V gap (5), said stiffening element, optionally, being a rope, a paper cord, a filament, or a wire.

12. The combination of claim 9, wherein the angle ($\alpha$) of said V-shaped gap (5) is, effectively, about 0°, whereby the gap is closed against the filter bag (2).

13. The combination of claim 9, wherein the gusset (9) is folded against the inner wall (7).

14. A method of making a holding frame (1) for a filter bag (2) as claimed in claim 1,
comprising forming the inner and outer walls of the frame (7, 6) and corner gussets (9) at one of the walls of the frame of cellulose or fibrous pulp stock, optionally wood pulp, recycled paper, recycled cardboard, recycled pulp board, or combinations thereof, in a shape in which the inner wall (7) and the outer wall (6) define a V-shaped gap (5).

15. The method of claim 14, including the steps of
forming the inner wall (7) of the frame with a stiffening web (17) extending across the frame;
permitting the pulp material to stiffen or harden; and severing the stiffening element (17).

16. The method of claim 14, including the steps of
forming on at least one of the walls (6, 7) with a stiffening element (17, 18) projecting laterally from the respective wall;
permitting the pulp material to stiffen or harden; and after stiffening or hardening, severing the stiffening element or elements.

17. The method of claim 16, wherein both the inner (7) and the outer (6) walls are formed with a respective stiffening element (17, 18).

18. The method of claim 14, wherein the pulp material comprises a mixture of pulp fibers and recycled paper or recycled cardboard or recycled carton material.

19. The method of claim 14, wherein the pulp material comprises a mixture of pulp fibers and recycled paper or recycled cardboard or recycled carton material.

20. The method of claim 14, wherein the gussets (9) are formed on the inner wall (7) of the frame.

* * * * *